United States Patent Office 3,505,060
Patented Apr. 7, 1970

3,505,060
REDUCTION OF OXIDIC FERROUS ORES
Günter Heitmann, Frankfurt am Main, Germany, assignor to Metallgesellschaft Aktiengesellschaft, Frankfurt am Main, Germany, a corporation of Germany, and The Steel Company of Canada Limited, Hamilton, Ontario, Canada, a corporation of Canada
No Drawing. Filed Apr. 28, 1967, Ser. No. 634,473
Claims priority, application Germany, May 5, 1966, M 69,397
Int. Cl. C21b 1/06
U.S. Cl. 75—1
9 Claims

ABSTRACT OF THE DISCLOSURE

A process for the reduction of oxidic ferrous ores wherein the ore is treated in a kiln and then in a furnace, preferably an electric furnace. The entire quantity of reducing agent necessary for both steps of the reducing process is fed to the kiln from the solid product discharge end thereof in such manner that the reducing agent is substantially evenly distributed throughout the width of the surface of the charge in a kiln portion having a length of at least about 4 meters.

---

The reducing agent is preferably high volatile content solid carbonaceous material which has a substantially even particle size distribution up to about 30 millimeters which is fed as an entrained solid.

The reduction of oxidic ferrous ores is a generally known process. It is known to carry out this reduction in a kiln, particularly a rotary kiln and/or in an electric furnace. Such reduction is often carried out with the use of solid carbonaceous reducing media, such as coal, which is sometimes coal having a high volatile content. It has been known to feed the reducing agent into the middle of the rotary kiln and to transfer the solids discharged from the rotary kiln directly into an electric furnace for complete reduction and smelting (see for example Swiss Patent No. 380,781).

It is also known to reduce iron ore to sponge iron in a rotary kiln by introducing a portion of the reducing agent thereinto from the solids discharge end thereof, to separate residual coke from the reduced ore and to feed said coke together with additional reducing agent into the ore charging end of the rotary kiln in admixture with ore feed (see for example printed German patent application No. 1,179,962 and U.S. application Ser. No. 981,280).

While the recited processes may provide improved results as compared with still older practice, they still contain disadvantages which it is desired to overcome. Some of these disadvantages relate to the smelting in the electric furnace. Other of these disadvantages relate to the operation and feed systems for the rotary kiln.

One particular problem relates to the fact that where the reducing agent is fed, even partially, to the kiln along with the ore, such increases the capital expense required for constructing the feed system. Further, it has been found that this type of reducing agent feeding results in a more or less discontinuous introduction of reducing agent whereby the generation of gas in the rotary kiln is irregular and often localized. Still further, since the air feed is introduced at a substantially constant rate, the composition of the reducing gas is subject to fluctuations. This creates non-uniformity in the reduction and combustion processes and created difficulties with respect to efficient utilization of heat and control of the process.

In the particular case of such reducing processes where reducing agents having high volatile content or high water content, such as for example lignites, are used, the above difficulties and fluctuations cause fluctuations in the internal pressure of the rotary kiln which adds still more difficulties in controlling the process in an efficient and substantially uniform manner. As can be appreciated, the above-noted process fluctuations and efficiency variations often results in a product having a non-uniform composition, depending upon the process variations. It can further be appreciated that such a non-uniform product is difficult to handle and to efficiently process in electric furnace reduction.

The other known processes which have been mentioned above have the disadvantage that only part of the carbon which is required for the entire process, including carburization, can be fed into the rotary kiln in the form of a coal having a high volatile content. As a result, more reducing agent for the reduction in the rotary kiln is required than where only reducing agents having a high content of volatile matter are employed, and an additional process step is therefor necessary, such as low-temperature distillation, to complete the process.

It is therefor an object of this invention to provide an improved process for the reduction of oxidic ferrous ores.

It is another object of this invention to provide an improved rotary kiln iron ore reduction process.

Other and additional objects of this invention will become apparent from a consideration of this entire specification including the claims hereof.

In accordance with and fulfilling these objects, one aspect of this invention resides in the reduction of oxidic ferrous ores in a rotary kiln of at least 4 meter length and the smelting of the product of said rotary kiln reduction is an electric furnace wherein solid carbonaceous materials having a high volatile content are utilized as the reducing agent and are introduced into the rotary kiln, in a proportion substantially sufficient for both kiln and furnace reduction, and substantially completely from the solids discharge end thereof and substantially evenly distributed throughout the width of the surface of the charge in a kiln portion having a length of at least about 4 meters. The reducing agent is introduced into the kiln in particulate form by mechanical and/or pneumatic means in such manner as to substantially evenly distribute such over the entire surface of the kiln charge.

It is preferred in the practice of this invention to provide pipes passing through the kiln shell which can be utilized for the introduction of secondary air thereinto. It is preferred in the practice of this invention to utilize reducing agents having substantially uniform particle size distribution up to about 30 millimeters. By uniform particle size distribution, there is meant that the reducing agent feed has particles of substantially all sizes up to about 30 millimeters with no particular particle size predominating. This latter preferred embodiment enables a substantially uniform surface distribution of reducing agent controlled by the physical laws of ballistics. Thus the larger particles will be distributed further from the inlet point than the finer particles.

It is within the scope of this invention to introduce the reducing agent by means other than that described above and still accomplish substantially uniform distribution thereof as required. One alternative method of introducing reducing agent involves the use of a plurality of feed pipes disposed at various angles to and in various positions around the kiln axis. In this embodiment certain more narrowly delineated particle size groups of reducing agent e.g. about 10 to 20 millimeters are introduced through various feed pipes so positioned as to deposit such particles substantially in the position desired on the kiln charge surface. By operating in this manner advantage can be taken of specific narrow particle size range reducing agent should such become available at economic advantage with respect to the uniformly distributed particle sizes of reducing agent set forth above.

Each feed pipe may be fed with the entire particle size range or with part of the particle size range of the reducing agent. In the first case, the distribution of the reducing agent in the rotary kiln is controlled by a selection of the inclination of each feed pipe from the kiln axis, of the diameter of the pipes and the speed at which the reducing agent is fed. In the second case, the distribution may be effected as a result of the ballistic range or may be additionally controlled as described for the first case.

In the case of pneumatic feeding, preheated, oxygen-containing gases are preferably used as an entraining fluid. In many cases, hot exhaust gases from the rotary kiln may also be employed to advantage.

If the ore to be reduced contains a substantial amount of fine particles, such fine particles may be separated according to a further feature of the invention from the coarse particles before the latter are charged to the rotary kiln, and the fine particles can be charged together with the reducing agent from the solids discharge end of the rotary kiln.

The process according to the invention has the following advantages:

Only one continuous feeder is used. The reducing agent required for the entire extraction (reduction) process may be fed in the form of carbonaceous reducing agents having a high content of volatile matter. The reducing process in the rotary kiln is performed in a substantially perfectly uniform manner. Less fixed carbon is required for the preliminary reduction because the entire reducing agent is substantially perfectly uniformly distributed throughout the surface of the ore and is drawn into the charge bed so that the cracked products derived from the volatile constituents flow through the bed and their reducing power is fully utilized. As the volatile constituents participate in the reduction, less fixed carbon is consumed for a given degree of reduction, or a given amount of reducing agent will result in a higher degree of reduction than in processes in which the gases are more or less locally evolved. In view of the higher degree of reduction, less electric energy is consumed for the final reduction in the electric furnace.

It is preferred in the practice of this invention to provide a carbonaceous reducing agent having a volatile content of at least about 18 percent.

The invention is illustrated by the following examples which are in no way determinative of the scope thereof. In the following examples, a rotary kiln was used containing shell tubes. The kiln had the following dimensions:

Kiln length—7.85 m.
Inside diameter—0.50 m.
Kiln inclination—5°
Shell tubes—8
Kiln rotation—0.6 r.p.m.

Iron ore was fed continuously together with flux materials into the feed end of the rotary kiln by means of a conveyor trough. Carbonaceous reducing agent was fed pneumatically into the discharge end of the kiln. The distribution of the carbonaceous reducing agent on the surface of the kiln charge could be varied and adjusted by variation of the inclination of the tube of the pneumatic feeding device or by regulating the feeding medium. Feeding mediums were various gases, flue gases and air.

EXAMPLE 1

All the iron ore was fed into the feed end of the kiln at a rate of 160 kg./h. The grain size was 0–20 mm., the iron content 55%.

68.8 standard cubic meter secondary air were fed by the shell tubes. The carbonaceous reducing agent with a grain size of 0–20 mm. was fed at a rate of 58.1 kg./h. The composition was:

|  | Percent |
|---|---|
| Moisture | 1.9 |
| Ash content | 11.5 |
| Carbon$_{fixed}$ | 54.9 |
| Volatile matter | 31.9 |

The pneumatic feeding device was run as follows:

Feeding medium (air)—50.5 standard cubic meter air
Tube inclination—+8.5°
Maximum range of projection—4.5 m.
Air temperature—30° C.

Reduction temperature was 1050° C.
Composition of kiln discharge material:

kg./h.—159.8
Total Fe—48.8%
Metallic Fe—17.0%
C—11.4%
Metallization (based on total Fe)—35.1%

EXAMPLE 2

The iron ore with a grain size of 5–20 mm. was fed into the feed end of the kiln at a rate of 120 kg./h. The iron content was 55%.

104 standard cubic meter secondary air were fed by shell tubes. The carbonaceous reducing agent with a grain size of 0–10 mm. was fed at a rate of 38 kg./h. together with the iron ore with a grain size of 0–5 mm. at a rate of 39.2 kg./h. by a first pneumatic feeding device into the discharge end of the kiln.

The carbonaceous reducing agent with a grain size of 10–20 mm. was fed at a rate of 20.8 kg./h. by a second pneumatic feeding device into the discharge end of the kiln.

The carbonaceous reducing agent had the same composition as in Example 1.

The pneumatic feeding device was run as follows:

|  | First Device | Second Device |
|---|---|---|
| Feeding medium (flue gas), standard cubic meter | 45 | 39 |
| Tube inclination, deg. | +7.5 | +8.5 |
| Flue gas temperature,° C | 150 | 150 |
| Maximum range of projection, m | 3.8 | 4.2 |

Reduction temperature was 1,050° C.

Composition of kiln discharge material:

kg./h.—168.4
Total Fe—50.3%
Metallic Fe—18.4%
C—11.2%
Metallization—36.6%

EXAMPLE 3

All the iron ore was fed into the feed end of the kiln at a rate of 160 kg./h. The grain size was 0–20 mm., the iron content 55%.

153 standard cubic meter secondary air were fed by the shell burners. The carbonaceous reducing agent was fed pneumatically by two feeding devices into the discharge end of the kiln. The composition was:

|  | Percent |
|---|---|
| Moisture | 5.1 |
| Ash content | 13.0 |
| Carbon$_{fixed}$ | 41.7 |
| Volatile matter | 40.2 |

The pneumatic feeding devices were run as follows:

|  | First Device | Second Device |
|---|---|---|
| Carbonaceous reducing agent, kg./h | 45 | 49.4 |
| Feeding medium (air), standard cubic meter | 40 | 43 |
| Air temperature, °C | 250 | 250 |
| Tube inclination, deg | +7 | +8 |
| Maximum range of projection, m | 3.5 | 4 |

Reduction temperature was 1,120° C.

Composition of kiln discharge material:

kg./h.—151.3
Total Fe—58.0%
Metallic Fe—57.1%
C—3.3%
Metallization—98.5%

The rate of primary air feed to the discharge end of the rotary kiln was as follows:

Example 1 Nm.³/h. _____ 75.5
Example 2 _____ 50.0
Example 3 _____ 68.0

The carbon content of the discharge materials was sufficient in respect to the final reduction and for producing pig iron or steel in an electric arc furnace.

What is claimed is:

1. In the process for the reduction of oxidic ferrous ores by subjecting said ores to reduction, first in a rotary kiln of at least about 4 meter length and then in an electric furnace, with the use of a solid carbonaceous reducing agent having a high volatile content; the improvement which comprises introducing substantially all of said reducing agent for said kiln and furnace reduction process into said kiln in particulate form from the solid product discharge end of the said kiln wherein said particles are of varying particle size up to about 30 mm., said particle sizes having substantially uniform distribution with no particular particle size predominating and substantially evenly distributing said particulate reducing agent ballistically throughout substantially the entire surface of the charge in the kiln whereby the larger particles will be distributed further from the inlet point than the fine particles from the solid product discharge and to at least about 4 meters therefrom toward the ore feed end.

2. The improved process claimed in claim 1 wherein said reducing agent has a relatively narrow particle size range of about 10 to 20 millimeters.

3. The improved process claimed in claim 1 wherein said reducing agent is introduced through the use of a substantially uniform propelling force whereby said particles are distributed ballistically.

4. The improved process claimed in claim 2 wherein said reducing agent is utilized in said narrow particle size range and is fed to said kiln through at least one feed pipe having a position and inclination relative to the axis of said kiln such that said particles are deposited on a predetermined portion of said kiln charge surface.

5. The improved process claimed in claim 1 wherein said reducing agent is introduced pneumatically.

6. The improved process claimed in claim 1 wherein said reducing agent is introduced mechanically.

7. The improved process claimed in claim 5 wherein reduction of said ore takes place throughout said kiln and where an oxygen containing gas is the pneumatic fluid.

8. The improved process claimed in claim 5 wherein hot exhaust gas from said kiln constitutes at least part of the pneumatic fluid.

9. The improved process claimed in claim 1 wherein ore fines are introduced with said reducing agent.

References Cited

UNITED STATES PATENTS

| 2,964,308 | 12/1960 | Walde | 75—1 X |
| 3,113,859 | 12/1963 | Mocklebust | 75—36 X |
| 3,180,725 | 4/1965 | Meyer et al. | 75—36 X |
| 3,206,299 | 9/1965 | Senior et al. | 75—11 |
| 3,269,827 | 8/1966 | Arneson et al. | 75—11 |

OSCAR R. VERTIZ, Primary Examiner

G. O. PETERS, Assistant Examiner

U.S. Cl. X.R.

75—4, 11